(No Model.)
H. K. KRIEBEL.
SHAFT COUPLING.
No. 304,110. Patented Aug. 26, 1884.
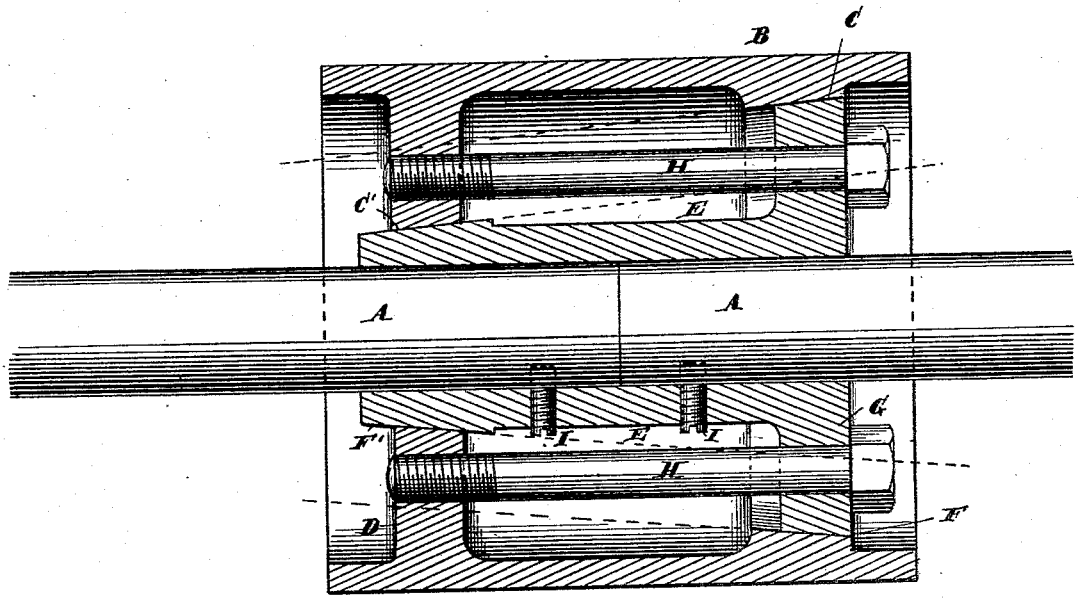
Fig. 1
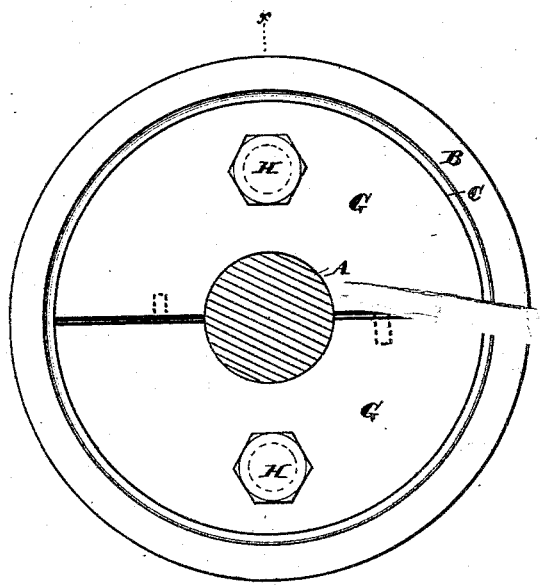
Attest
G. E. Hummel
J. P. Ritter
Inventor
Hosea K. Kriebel
By his atty.

UNITED STATES PATENT OFFICE.

HOSEA K. KRIEBEL, OF WEST POINT, PENNSYLVANIA.

SHAFT-COUPLING.

SPECIFICATION forming part of Letters Patent No. 304,110, dated August 26, 1884.

Application filed July 5, 1884. (No model.)

*To all whom it may concern:*

Be it known that I, HOSEA K. KRIEBEL, of the town of West Point, Montgomery county, and State of Pennsylvania, have invented a new and useful Improvement in Couplings, of which the following is a specification.

My invention has reference to shaft-couplings; and it consists of a shell or drum having two conical faces, both pointing in the same direction, but not coincident with each other, in combination with clamping-jaws having conical faces arranged to work against the conical faces upon said drum, and in details of construction, all of which is fully set forth in the following specification and shown in the accompanying drawings, which form part thereof.

Heretofore couplings have been made with two split cones or jaws tapering in opposite directions, and working in a properly-shaped drum, the said cones being drawn together to clamp the shaft; or they have been made with a single cone, equivalent to one-half of the coupling first referred to; but in these couplings, to make the taper slight, by which greater clamping-power is attained, it is necessary to make them very long if the clamping-bolts are to pass through said conical jaws; or they must be provided with extensions, flanges, or lugs, through which said bolts pass, which latter construction is defective, as the strains are not transmitted in a manner to produce the most effective clamping action, and the parts are liable to bind more or less, and thereby eliminate what would otherwise have been useful results.

The object of my invention is therefore to overcome these defects by the construction hereinafter fully set forth, whereby the clamping-bolts are enabled to act in a line between the two conical faces, to the end that the strains are transmitted equally along the entire pair of jaws and in a line with their movement, being substantially balanced upon each side of the said bolts; also, to enable the length of the coupling to be reduced to a minimum length without losing any of the advantageous effects resulting from the use of conical surfaces of small angles; and, finally, to simplify the construction of couplings, and so form it that it does not weigh more than about two-thirds as much as the corresponding size of coupling now in the market.

In the drawings, Figure 1 is a sectional elevation of a coupling on line $x$ $x$ of Fig. 2, embodying my improvements, and Fig. 2 is an end elevation of same.

A A are the two ends of the shafts to be coupled.

B is the coupling drum or cylinder, and is provided on one end with the conical face C, and upon the other with a head, D, having its inner edge also made conical, as at C', which faces are as if made from the same cone, or have the same obliquity; but their surfaces are not coincident with each other, as is indicated in dotted lines.

E E are the clamping-jaws, and one of their ends have flanges G, the outer faces of which are made conical or tapering, as at F, and are made to work in contact with face C on drum B, and the other of their ends are provided with conical faces F', which work in contact with faces C' on the said drum. By this means the space between the head D and flange G is hollow, and the tightening-bolts H are passed through the flanges G, and screw into the head D in a line preferably between the conical faces F and F', continued as indicated in dotted lines.

I I are pins carried by the jaws E, which enter the shaft ends to prevent them turning therein. In place of these pins, keys may be used. The jaws E E may be made integral, if desired, by not splitting the flange G entirely across.

The distribution of metal may be modified in any manner to suit the fancy or taste, or to strengthen the coupling, and the same principle may be used upon inclined faces which are not conical, and is within the scope of my invention. I therefore do not limit myself to the construction shown, as it may be modified in various ways without departing from the spirit of my invention.

Having now described my invention, what I claim as new, and desire to secure by Letters Patent, is—

1. A coupling consisting of a shell or drum having two conical faces, both pointing in the same direction, but not coincident with each other, in combination with clamping-jaws having conical faces arranged to work against the conical faces upon said drum, substantially as and for the purpose specified.

2. A coupling consisting of a shell or drum having two conical faces, both pointing in the same direction, but not coincident with each other, in combination with clamping-jaws having conical faces arranged to work against the conical faces upon said drum, and bolts or screws to force said jaws into said drum, substantially as and for the purpose specified.

3. A coupling consisting of a shell or drum having two conical faces, both pointing in the same direction, but not coincident with each other, in combination with clamping-jaws having conical faces arranged to work against the conical faces upon said drum, pins upon said jaws, and adapted to enter apertures in the shaft to prevent the latter turning in said coupling, and bolts or screws to force said jaws into said drum, substantially as and for the purpose specified.

4. A coupling or clamp-body having two inclined surfaces, the inclinations of which being substantially parallel, but not coincident or in the same plane, and a jaw having faces corresponding to said inclined faces of the body, substantially as and for the purpose specified.

5. A coupling or clamp-body having two inclined surfaces, the inclinations of which being substantially parallel, but not coincident or in the same plane, and a jaw having faces corresponding to said inclined faces of the body, and a bolt or screw to force said jaw into said body, substantially as and for the purpose specified.

6. The combination of drum B, having inclined faces C C' parallel but not in the same plane, with jaws E, having faces F F', corresponding with faces C C', substantially as and for the purpose specified.

7. The combination of drum B, having inclined faces C C' parallel but not in the same plane, with jaws E, having faces F F', corresponding with faces C C', and bolts H, substantially as and for the purpose specified.

8. The combination of drum B, having head D and inclined faces C C', parallel but not in the same plane, with jaws E having flange G and faces F F', corresponding with faces C C', and bolts H, substantially as and for the purpose specified.

In testimony of which invention I hereunto set my hand.

HOSEA K. KRIEBEL.

Witnesses:
W. C. BUFFINGTON,
I. R. CASSEL.